United States Patent [19]

Artola Ugarte

[11] Patent Number: 5,048,352
[45] Date of Patent: Sep. 17, 1991

[54] RACQUET STRING TENSION MEASURING DEVICE

[75] Inventor: Felipe Artola Ugarte, Vizcaya, Spain

[73] Assignee: Masker, S.A., Bizkaia, Spain

[21] Appl. No.: 436,884

[22] Filed: Nov. 16, 1989

[30] Foreign Application Priority Data

Nov. 22, 1988 [ES] Spain .................................. 8803577

[51] Int. Cl.[5] .............................................. G01L 5/04
[52] U.S. Cl. ................................................. 73/862.45
[58] Field of Search ............ 73/862.45, 862.47, 862.48

[56] References Cited

U.S. PATENT DOCUMENTS

| 4,077,256 | 3/1978 | Hollander | 73/862.45 |
| 4,116,054 | 9/1978 | Howe | 73/862.45 |
| 4,590,808 | 5/1986 | Lightfoot et al. | 73/862.48 |
| 4,846,002 | 7/1989 | Brunner | 73/862.47 |

*Primary Examiner*—Charles A. Ruehl
*Attorney, Agent, or Firm*—Browdy and Neimark

[57] ABSTRACT

A measuring device for measuring the degree of tension of stringing in a racquet for tennis, squash etc. where string deflecting force and string deflection in response to the force are measured. The useful or real efficiency of a specific racquet can then be determined independently of the degree of elasticity of the material used for stringing.

3 Claims, 2 Drawing Sheets

RACQUET STRING TENSION MEASURING DEVICE

The invention relates to a device for measuring the stringing tension of racquets for tennis, squash, etc., and similar ones, and more specifically to device for measuring the real or useful efficiency of a racquet with complete independence of the material used for the stringing of the said racquet.

In a certain racquet, when it is strung, the tension with which the material for the said strings has been placed is known. However, after some time has passed and due to several factors, this tension is altered. Among these factors it is worth mentioning the deformation of the stringing through practising the game itself, the humidity that it is submitted to, etc., so that the initial tension becomes altered.

The invention deals with an effective measuring device, which is capable of measuring the degree of tension of the string of a racquet, through measuring the force needed to deform the stringing with a certain deflection. With this, the deformation of the stringing in the presence of an applied force can be tested. Consequently, the sought real or useful efficiency of a racquet is measured, and all this is totally independent of the degree of elasticity of the material used for stringing the racquet.

Obviously, we will therefore handle two concepts, one called *deflection*, which is the deformation of the stringing, and the other called *force* or *stress*, which is what will have to be applied to provide the said deflection.

The invention proposes two ways of carrying out the application of the measuring device, namely:

(1) By performing a pushing action on the stringing, in direction from the appliance itself and towards the said stringing.
(2) By performing a pulling action on the stringing, in direction from the stringing itself towards the said device or appliance.

As regards the way of applying the measuring device, according to 1, it is possible to carry out this application under two different aspects, namely:

1.1. Place the racquet on a flat surface, so that the force or stress applied on the stringing by means of the measuring device is borne by the said flat surface of the racquet itself, either by support of the frame around the stringing or by support of the racquet handle.

1.2. Support the frame around the stringing of the racquet (the racquet head) over another frame, coming from the measuring device itself, which establishes a relative displacement between the said frame of the measuring device and the system of application of force included in the measuring device.

This frame can be supported either on the racquet frame or on the stringing of the racquet.

As regards the other method of application of the measuring device, according to the invention, and in accordance with way of operation (2), it is possible to apply the device under two other aspects:

2.1. Support the racquet frame on another frame that comes from the measuring device.
2.2. Support a section of the racquet stringing on a frame that comes from the measuring device.

Having established these ways of applying the invention, we wish to point out the method of operation to perform measuring of the deflection that is provided by the deformation of the stringing.

To do this, measuring is carried out of the relative displacement between a point which is considered fixed, for example the flat surface on which the racquet can be supported, in one case, and in the other, the support point that is formed on the frame that comes from the measuring device.

Measurement of the force which provides the said deformation of the stringing is carried out by measuring the variation in length of a spring through which the force in question is applied.

The methods of carrying this out will be as follows:

To measure the deflection by pushing, that is, from the measuring device towards the stringing, an element such as a rod is kept constantly supported on the flat surface on which the racquet is positioned or on the support frame, either by gravity or actuated by a small spring. The variation of the relative position of this rod and the body of the pushing force applicator device is measured on a scale arranged on either of the two elements, thanks to a mark or index arranged on the other of the said two elements.

Measurement of the deflection by traction on the stringing, that is, from the said stringing and towards the device, is carried out in the same way.

To measure the force supplied on the stringing or on a part of the stringing, and as this force is applied by means of a spring, the variation in length of this tared spring is measured on a scale and an index placed, one on a part which applies the said force on the stringing, and the other on the device itself which receives the force.

Consequently, we obtain a device which provides a force on the stringing of a racquet, which causes a deformation of this stringing, and in which this deformation produces a deflection of the stringing, so that both the deflection and the force are perfectly measured to give the degree of deformation of the stringing in the presence of an applied force. Consequently, the sought useful efficiency of a racquet is measured.

This measurement can take the form of a scale which can coincide or not with the tension at which the racquet was strung.

The invention will be understood in greater detail on reference to the accompanying sheets of drawings, in which non-restrictive examples of putting the device into practice are shown. Thus, FIG. 1 shows a measuring device, according to the invention.

Figure 1:
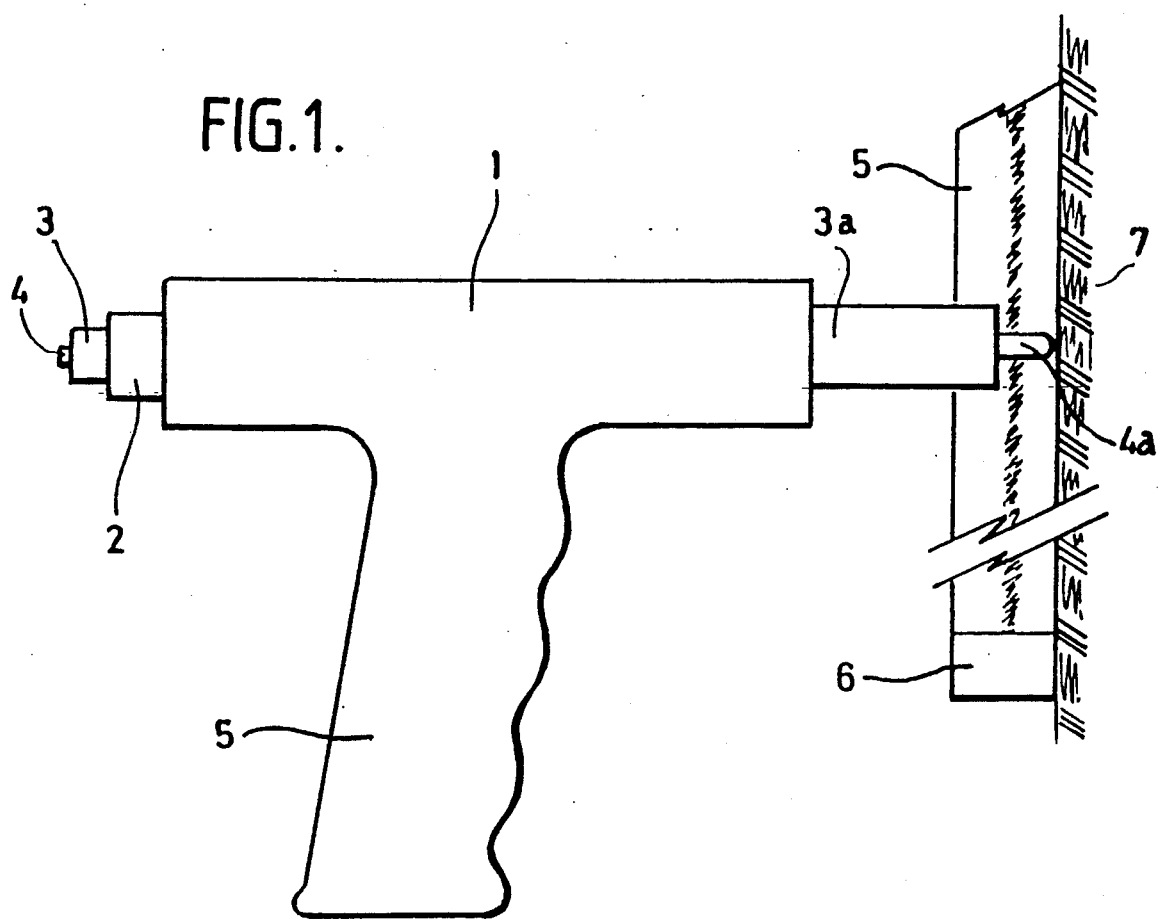

With reference to FIG. 1, a measuring device (1) of the push type can be seen, with the action from the device and towards the stringing, laid out in direction towards a racquet 6, which is supported on any surface 7. A rod 4 protrudes out at 4a at the front end of the device and rests on the surface 7. A force applicator 3-3a, which is kept in contact with the stringing 5 of the racquet 6, also protrudes from the device itself. To apply force, the hand-grip 5 of the device 1 will be operated in such a way that pressure is placed on the stringing.

The force applicator or pusher 3-3a is connected with a tared or gauged internal spring, and the measurement of the deflection will be the penetration of the end 4a of the rod, which can be measured by the projection of the other end 4 in relation to the protruding end 3 of the pusher.

Measurement of the force will be observed by the protrusion of the end 3 of the pusher in relation to the rear section 2 of the device 1.

Figure 2:
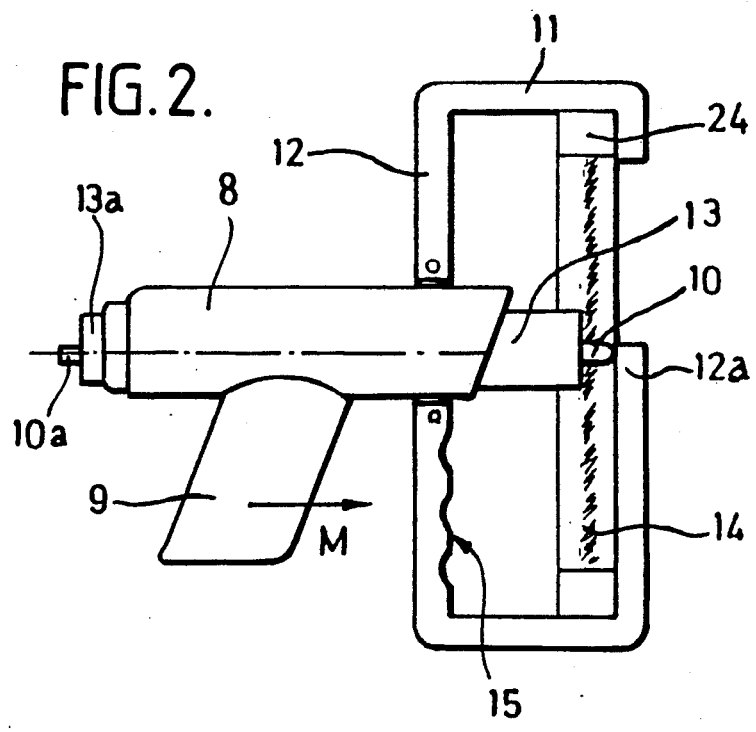
FIG. 2 is a side elevation of another device, according to the invention.

In FIG. 2 the measuring device is also of the push type, from the device itself towards the stringing, although in this case the device 8 carries with it a frame 11, which protrudes from the device itself and in which the racquet is kept in a fixed position.

This frame 11 is, or can be, of the foldable, articulated type, etc. on the device 8 itself and the rod 10, which will be rested on the front stop 12 of the frame, stems from its front end. In the same way, a pusher 13 will make contact with the stringing 14. To apply force, the user's hand is placed over the hand-grip 9, so that the hand-grip moves in the direction of (M). Measuring of the deflection and of the force is carried out between 10a and 13a on the one hand and between 8 and 13a on the other.

Figure 3:
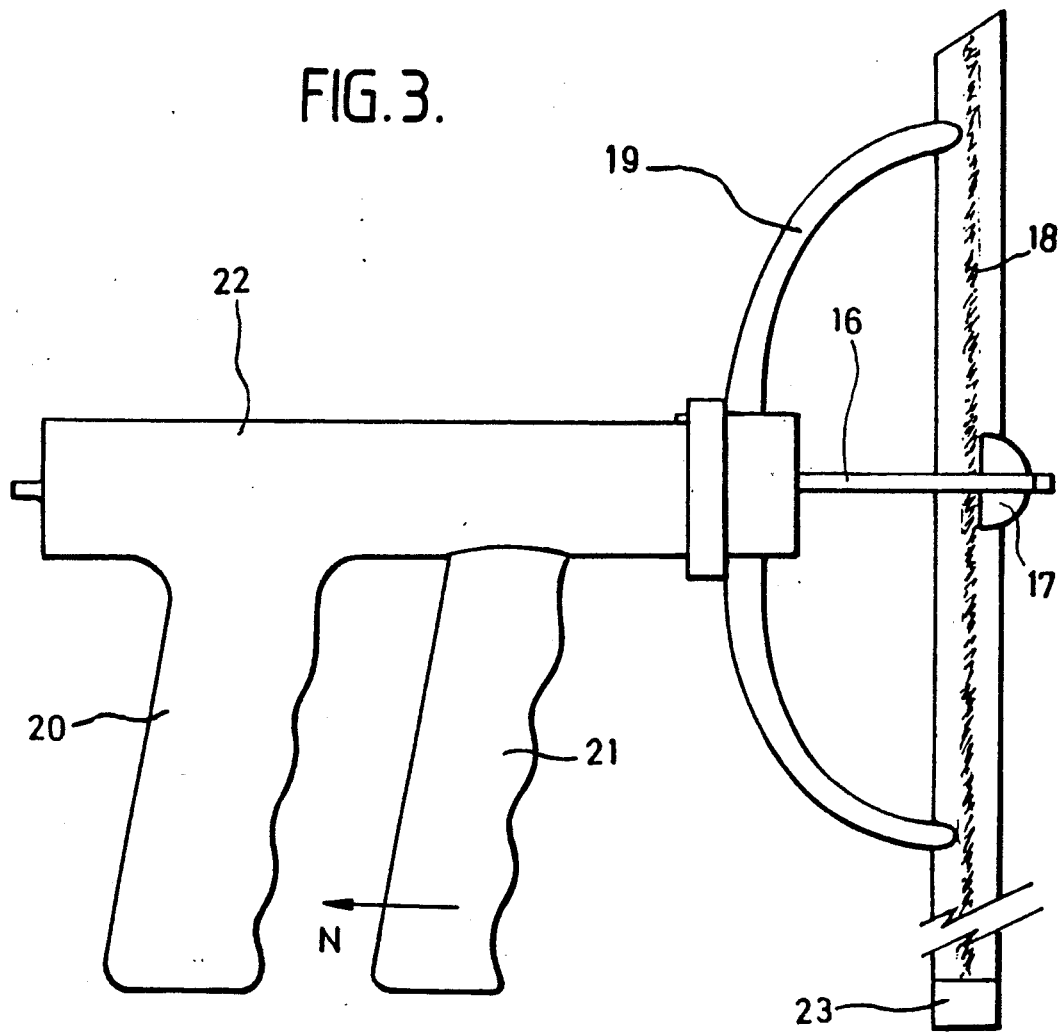
FIG. 3 shows another variant of the invention.

FIG. 3 shows a device of the pulling or traction type, in which force is applied from the stringing and towards the device. From the body 22 of the device, a rod 16 juts out towards the right, where it has a front stop 17 that rests on the stringing 18 of the racquet 23.

The racquet 23 or, where appropriate, the stringing 18 is received by the projecting arms 19 which come from the device, through the arm ends being supported on the frame or stringing 18 itself.

Operating the forward hand-grip 21 towards the rear hand-grip 20 according to N, carried out by means of a spring, makes the stop 17 pull the stringing 18 towards the device.

In this case, the measuring of the force applied is carried out by measuring, on a suitable scale, the variation of the distance between the two ends of the spring.

The deflection will be measured by the relative variation between the rod 16 and the fixed frame 19-22.

I claim:

1. A racquet string tension measuring device, said device having a body and comprising in combination:
   means for fixing the relative position of said device and said racquet;
   means for applying a force to stringing on said racquet and for deflecting said stringing;
   means to measure said force;
   means for measuring stringing deflection;
   a force applicator part of said means for applying a force protruding from said body;
   a rod (4a) movably mounted on and protruding from said force applicator part (3a);
   wherein said rod is supported on said means for fixing the relative position of said device and said racquet;
   wherein said means for fixing the relative position supports said racquet;
   wherein said means for deflection measurement comprises means for measuring relative displacement between said force applicator part and said rod; and
   wherein said means for force measurement comprises means for measurement of the relative displacement between said device body and said force applicator part.

2. A racquet string tension measuring device, according to claim 1:
   wherein said means for fixing the relative position of said racquet comprises:
   frame means projecting from said device body for positioning and supporting said racquet and said frame means has;
   an outer stop (12a) aligned with said rod.

3. A racquet string tension measuring device in accordance with claim 2 wherein said frame is positioned against a frame portion of said racquet.

* * * * *

UNITED STATES PATENT AND TRADEMARK OFFICE
CERTIFICATE OF CORRECTION

PATENT NO. : 5,048,352

DATED : September 17, 1991

INVENTOR(S) : Felipe Artola UGARTE

It is certified that error appears in the above-identified patent and that said Letters Patent is hereby corrected as shown below:

Title page, Item [73], delete "MASKER" and insert therefore --MAKSER--.

Signed and Sealed this

Ninth Day of March, 1993

*Attest:*

STEPHEN G. KUNIN

*Attesting Officer*   *Acting Commissioner of Patents and Trademarks*